T. H. SPENCER.
Blacking Box.
No. 57,401.
Patented Aug. 21, 1866.
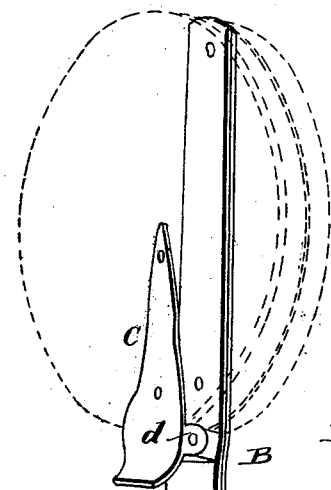
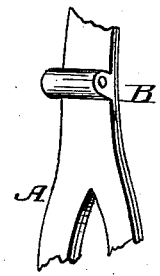
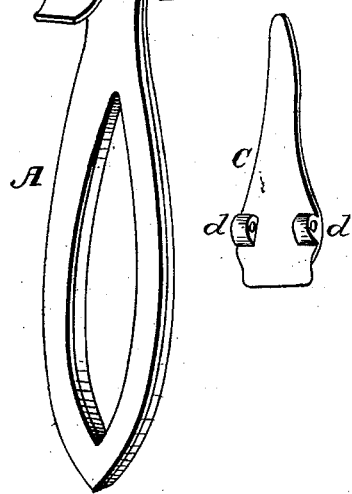
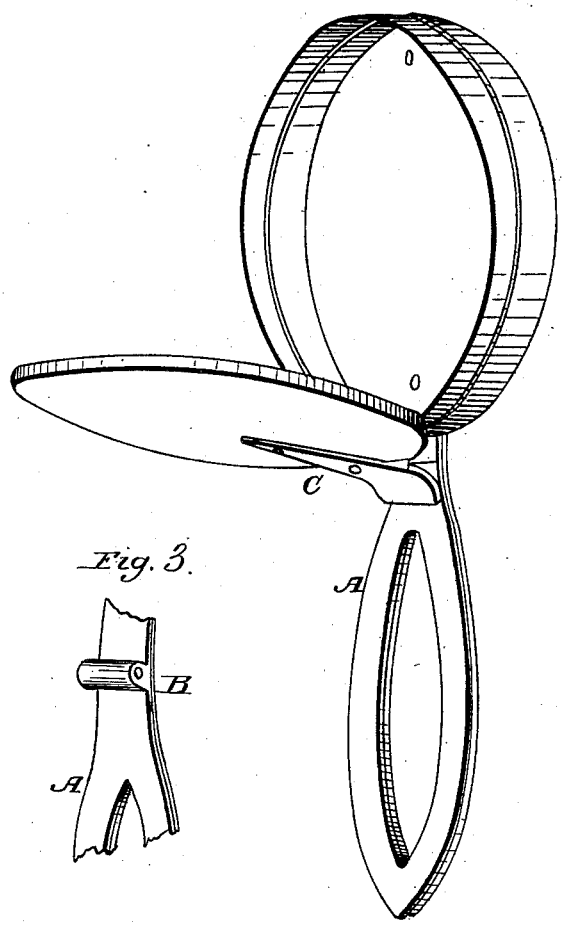
Witnesses:
John D. Thurston
Charles L. Spencer
Inventor:
Thomas H. Spencer

UNITED STATES PATENT OFFICE.

THOMAS H. SPENCER, OF PROVIDENCE, RHODE ISLAND.

IMPROVED BLACKING-BOX.

Specification forming part of Letters Patent No. 57,401, dated August 21, 1866.

*To all whom it may concern:*

Be it known that I, THOMAS H. SPENCER, of the city and county of Providence, in the State of Rhode Island, have invented a new and useful Improvement in Blacking-Boxes; and I do hereby declare that the following specification, taken in connection with the drawings annexed, is a full, clear, and exact description thereof.

Figure 1 is a perspective view of my invention, with dotted lines showing a blacking-box closed. Figs. 2 and 3 are detailed parts. Fig. 4 is a perspective view, showing a blacking-box open, as in use.

In the accompanying drawings, A, Fig. 1, is a long piece of iron or metal, at one end and on the upper surface of which is attached a box, the opposite end being made a suitable shape for the purpose of holding in the hand.

B, Fig. 3, is a projection on the upper surface of A, and near its center. This projection B is provided with a hole near its upper end, to form part of a hinge or joint.

C, Fig. 2, is a piece of metal with two projections, D D, each provided with holes near one end, and made to fit projection B, and, when connected by a wire, forms a hinge, as shown in Fig. 1. At one end of C, and on its under surface, is fastened a cover, the opposite end of C being made a little curving for the purpose of pressing on the thumb to open the cover and for holding it as a fender when in use, as shown in Fig. 4.

The advantages of my invention over all others are, with the handle the box can be held firmer, the cover can be opened with little trouble, always being in the right place to be closed, and when open forms a fender to prevent the blacking from soiling the hands or clothes.

I do not claim the blacking-box as my invention; but

What I do claim as my invention, and wish to secure by Letters Patent of the United States, is—

The combination of the box with the handle A, joined at B, and furnished with a short arm, C, for holding the cover, all as described, and for the purpose set forth.

THOMAS H. SPENCER.

Witnesses:
  JOHN D. THURSTON,
  CHARLES L. SPENCER.